US 6,695,089 B2

(12) United States Patent
Adachi et al.

(10) Patent No.: US 6,695,089 B2
(45) Date of Patent: Feb. 24, 2004

(54) MOTORCYCLE FRAME

(75) Inventors: Eiji Adachi, Saitama (JP); Takanori Okuma, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,839

(22) Filed: Mar. 30, 2001

(65) Prior Publication Data

US 2001/0045312 A1 Nov. 29, 2001

(30) Foreign Application Priority Data

Mar. 31, 2000  (JP) ........................................ 2000-096804

(51) Int. Cl.$^7$ .............................................. B62D 21/00
(52) U.S. Cl. ..................... 180/311; 180/219; 280/281.1
(58) Field of Search ................................ 180/219, 311, 180/312, 225, 227; 280/281.1, 280, 284

(56) References Cited

U.S. PATENT DOCUMENTS

| 4,662,645 A | * | 5/1987 | McMurtrey .................. 280/279 |
| 4,742,884 A | * | 5/1988 | Ishikawa ..................... 180/219 |
| 4,805,716 A | * | 2/1989 | Tsunoda et al. ............. 180/219 |
| 5,261,504 A | * | 11/1993 | Katsura ....................... 180/219 |
| 5,701,853 A | * | 12/1997 | Takahashi ............. 123/196 AB |
| 5,845,728 A | * | 12/1998 | Itoh et al. .................... 180/219 |
| 6,182,994 B1 | * | 2/2001 | Gogo et al. .................. 180/227 |
| 6,186,550 B1 | * | 2/2001 | Horii et al. .................. 180/225 |
| 6,332,505 B1 | * | 12/2001 | Tateshima et al. .......... 180/229 |
| 6,360,839 B1 | * | 3/2002 | Urano et al. ................. 180/229 |
| 2002/0043415 A1 | * | 4/2002 | Okuma et al. .............. 180/225 |

FOREIGN PATENT DOCUMENTS

| JP | 60094817 A | * | 5/1985 | .................. 237/70 |
| JP | 02074488 A | * | 3/1990 | ........... B62K/11/02 |
| JP | B2-2951338 | | 7/1999 | |

* cited by examiner

Primary Examiner—Lesley D. Morris
Assistant Examiner—Daniel Yeagley
(74) Attorney, Agent, or Firm—Birch, Stewart, Kolasch & Birch, LLP

(57) ABSTRACT

A motorcycle frame includes a down tube structured to be light in weight and shaped to simplify radiator piping. The down tube extends diagonally downwards from a head pipe to a front of an engine. The down tube is formed of an angular cross section pipe, with a rib being integrally formed on a front surface inner side, extending vertically. A lower half of a rear surface section of the down tube is made into a tapered section. A space is formed between the tapered section and front sections of a cylinder head and a cylinder head cover of the engine. A water hose of a radiator and an exhaust pipe are arranged in the space.

9 Claims, 10 Drawing Sheets

MOTORCYCLE FRAME

BACKGROUND OF THE INVENTION

1. Field of the Invention

This invention relates to a motorcycle frame, and more particularly to an advantageous structure of a down frame running from a head pipe and sloping downwards to the front of an engine.

2. Description of the Relevant Art

Japanese Patent No. 2951338 discloses a structure of a mainframe extending from a head pipe. The mainframe uses an angular cross section pipe towards the rear, and a down frame extending diagonally downwards. The down frame is formed by a swaging process.

Because the pipe cross-section of the pipe frame is decided in line with sections where stress is a maximum, the pipe section is formed having the same cross section for sections where stress is less. Because the same cross section is used throughout, a weight of the frame is increased.

The above described swaging process of the related art forms a circular pipe into a tapered shape by rotational swaging. Next, the pipe is formed into an angular cross section by press molding, or the like. This means that the thickness of particular places is varied inside one original cross section, and it is not possible to perform swaging for a pipe having a cross section, such as a bisected rectangle.

Therefore, there exists a need in the art for a vehicle frame having a cross sectional shape conforming to a required stress distribution. There is a need in the art for such a vehicle frame, having a reduced weight. And, there is a need in the art for such a vehicle frame, which can be made easily.

SUMMARY OF THE INVENTION

It is an object of the present invention to alleviate one or more of the drawbacks of the background art by addressing one or more of the existing needs in the art.

In order to solve the above described problems, a motorcycle frame of the present invention comprises a main frame running from a head pipe, above an engine and towards the rear of the vehicle, and a down pipe running from the headpipe and sloping diagonally downwards to the front of the engine. The down frame is formed of an angular cross section pipe member, with a strengthening rib being integrally provided on an inner surface of the down frame.

The down frame of the present invention has the rib formed on the inner surface of a front side section, which means that the front side of the down frame, which has maximum stress sections, can be made especially rigid, while other sections can be made comparatively thin. This arrangement allows the down frame to have a cross sectional shape conforming to an actual stress distribution. Further, the arrangement contributes to reduction in the overall weight of the vehicle frame.

A pipe, having this type of angular cross section has the rib integrally formed on the inner surface and a previously extruded angular cross section pipe can be easily obtained using a swaging process. At the time of production, it is also possible to form an asymmetrical shape, having only a rear side surface section tapered.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
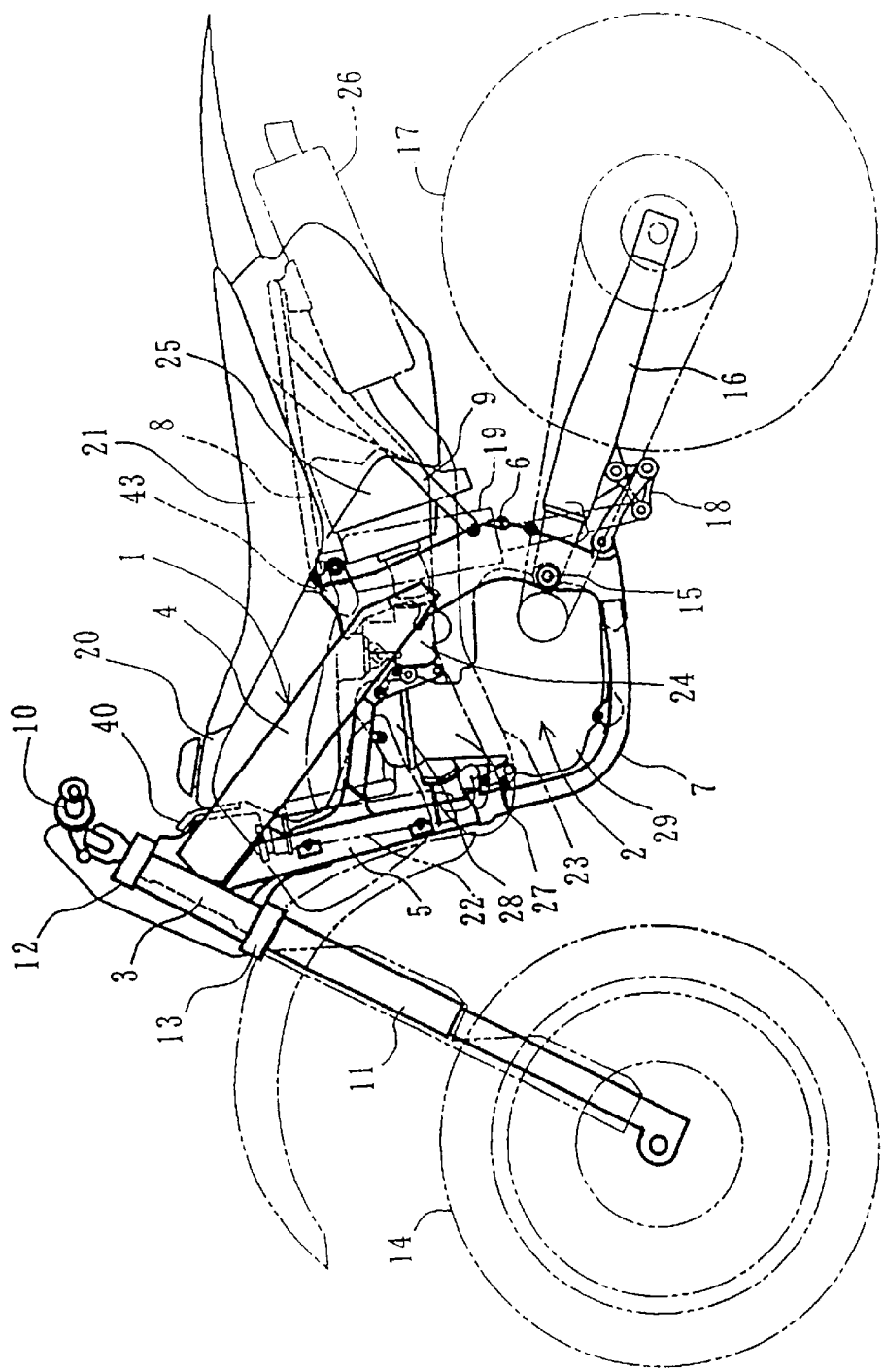
FIG. 1 is a left side view of an off-road type motorcycle, in accordance with the present invention.

Referring to FIG. 1, a motorcycle body frame 1 has a cradle shape and supports a water-cooled 4-cycle engine 2. The motorcycle body frame 1 includes a pair of left and right main frames 4. The left and right mainframes 4 extend from a headpipe 3, over the engine 2, to the rear of the vehicle.

A down tube 5 is positioned in front of the engine 2, and extends forward and downward from the head pipe 3 along the center of a motorcycle. A pair of left and right pivot plates 6 are coupled to rear ends of the right and left main frames 4. The left and right pivot plates 6 extend upward and downward behind the engine 2.

A pair of left and right lower frames 7 extend under the engine 2 and connect a lower end of the down tube 5 to the left and right pivot plates 6, respectively. A pair of seat rails 8 extend rearward from upper ends of the pivot plates 6. The pair of seat rails 8 have their rear ends connected to intermediate portions of the pivot frames 6 using an oblique rear pipe 9.

Left and right front forks 11 are movably supported by the head pipe 3 via top and bottom bridges 12 and 13. The left and right front forks 11 are steered by a handle bar 10. FIG. 1 also illustrates a front wheel 14.

A front end of a rear swing arm 16 is movably supported at the intermediate portions of the pivot frames 6 using a pivot shaft 15. A rear wheel 17 is supported by the rear end of the rear swing arm 16. A rear shock absorber or strut 19 is attached between a link 18 in front of the rear swing arm 16 and a rear cross member 43 at the upper ends of the pivot plates 6 (to be described later). The rear shock absorber or strut 19 and its connections are part of a rear wheel suspension system.

A fuel tank 20 is supported between the left and right main frames 4. A seat 21 is supported on the left and right seat rails 8. FIG. 1 also illustrates radiators 22, an exhaust pipe 23, a carburetor 24, an air cleaner 25, and a muffler 26 of the motorcycle.

Figure 2:
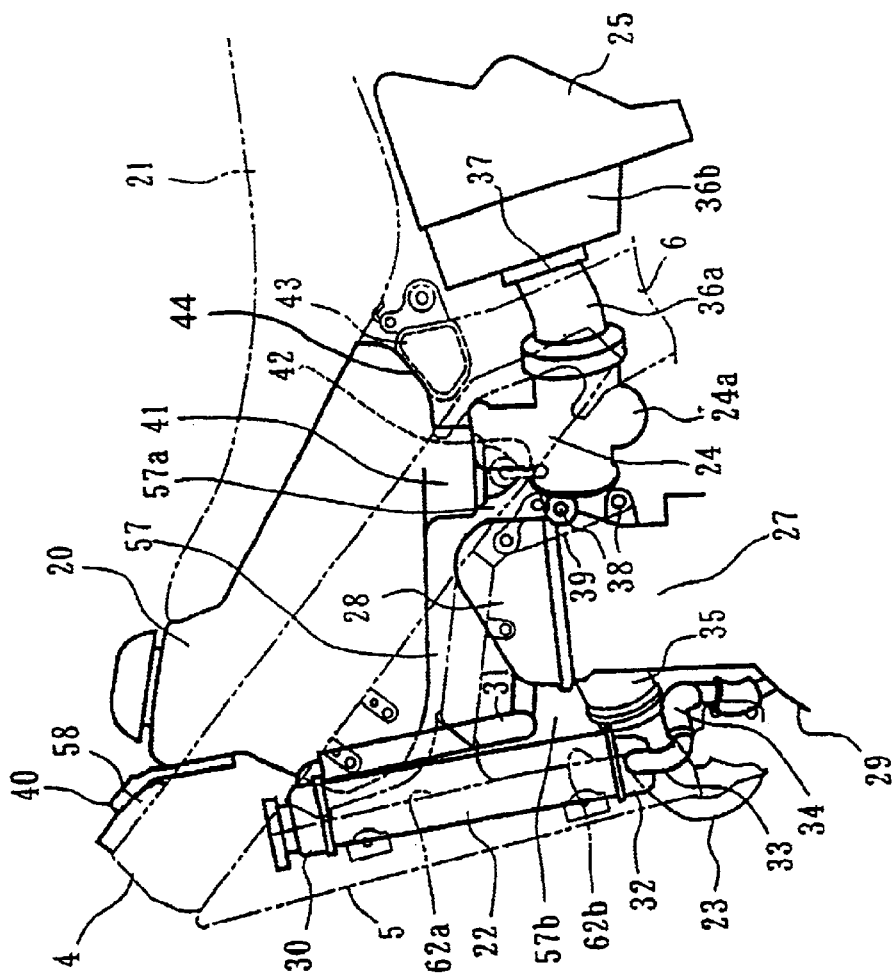
FIG. 2 is a left side view illustrating an arrangement of components positioned above an engine of the motorcycle.

As shown in FIG. 2, the engine 2 is a water-cooled 4-cycle engine, including a cylinder head 27 standing substantially upright. A cylinder head cover 28 is substantially triangular, when viewed from the left side of the motorcycle. The rear end of the cylinder head cover 28 extends into a space between the right and left main frames 4. An exhaust passage 35 is provided at the front center of the cylinder head 27, and connects to the exhaust pipe 23.

Figure 5:
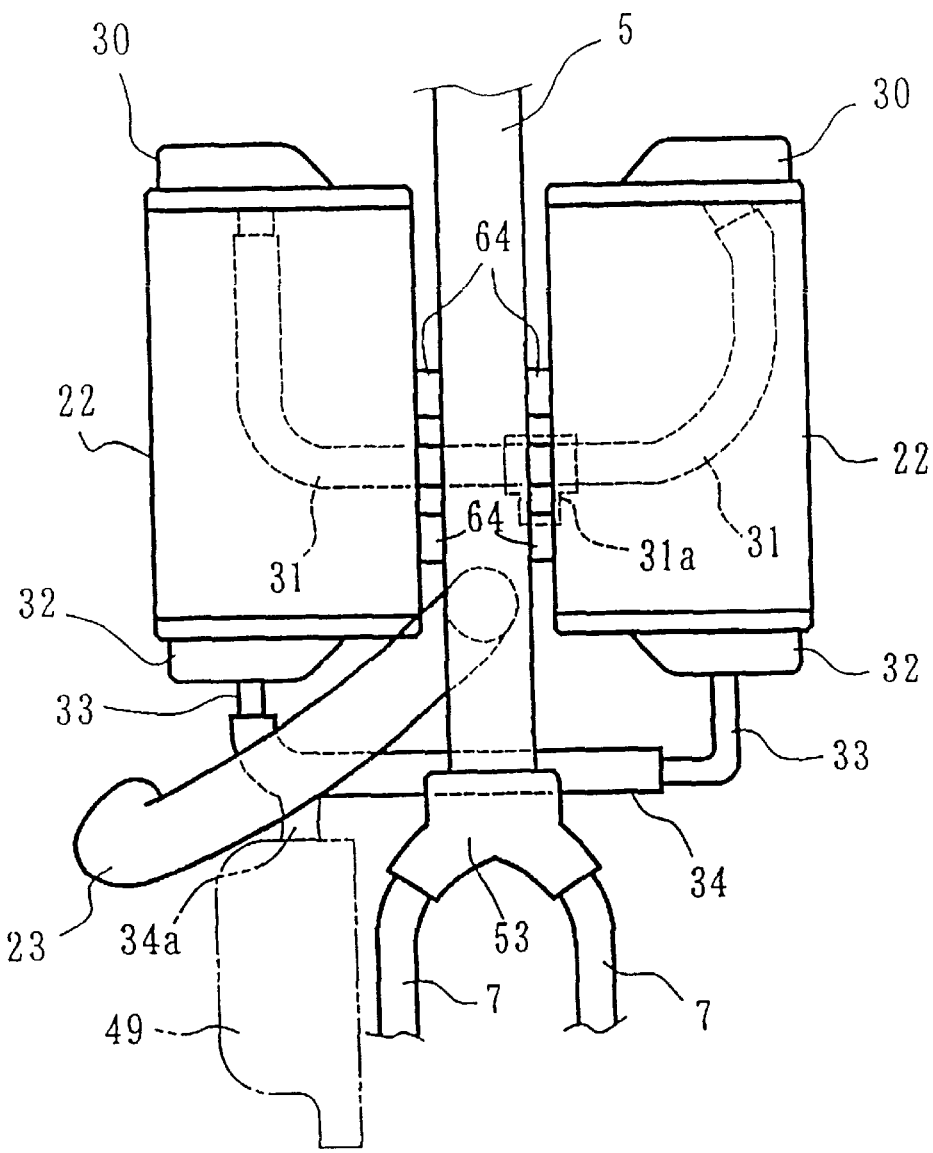
FIG. 5 is a close-up view of the components around a down tube of the motorcycle's frame.

As illustrated in FIG. 5, left and right radiators 22 are supported at opposite sides of the down tube 5. A return water hose 31 extends between upper tanks 30 of the radiators 22. A water hose 33 extends between lower tanks 32 of the radiators 22, and is connected to a crankcase 29 (see FIG. 2).

As illustrated in FIG. 2, the carburetor 24 is connected to an intake port on the rear surface of the cylinder head 27. The carburetor 24 has an intake upstream side thereof connected to a front part of the air cleaner 25 via a connecting tube 36. The connecting tube 36 extends across a part where the rear ends of the main frames 4 and the upper part of the pivot plates 6 are joined, when viewed from the left side of the motorcycle.

The connecting tube 36 is divided at the center thereof into a front part 36a and a rear part 36b. The rear part 36b is attached to the front part of the air cleaner 25. The front and rear parts 36a and 36b are detachably connected at a dividing position 37. The dividing position 37 is present behind the rear ends of the pivot plates 6, which enables the front and rear parts 36a and 36b to be easily assembled and maintained.

The fuel tank 20 has the front end thereof attached to a boss 58 at the upper part of the main frames 4 using a bracket 40, and a bolt or the like. A rear end of the fuel tank 20 is supported on a rear cross member 43 provided between the upper ends of the pivot plates 6. The fuel tank 20 has a projection 41 extending downward from it's rear lower part. A fuel cock 42 is attached to the bottom of the projection 41.

The projection 41 is positioned in a space 57a. The space 57a is defined behind the cylinder head 27 and cylinder head cover 28, which extend toward the top of the 4-cycle engine 2, and in front of the rear cross member 43. The projection 41 is as high as the head cover 28 along the length of the motorcycle, and overlaps with the upper part of the carburetor 24 when viewed from the left side of the motorcycle.

Figure 3:
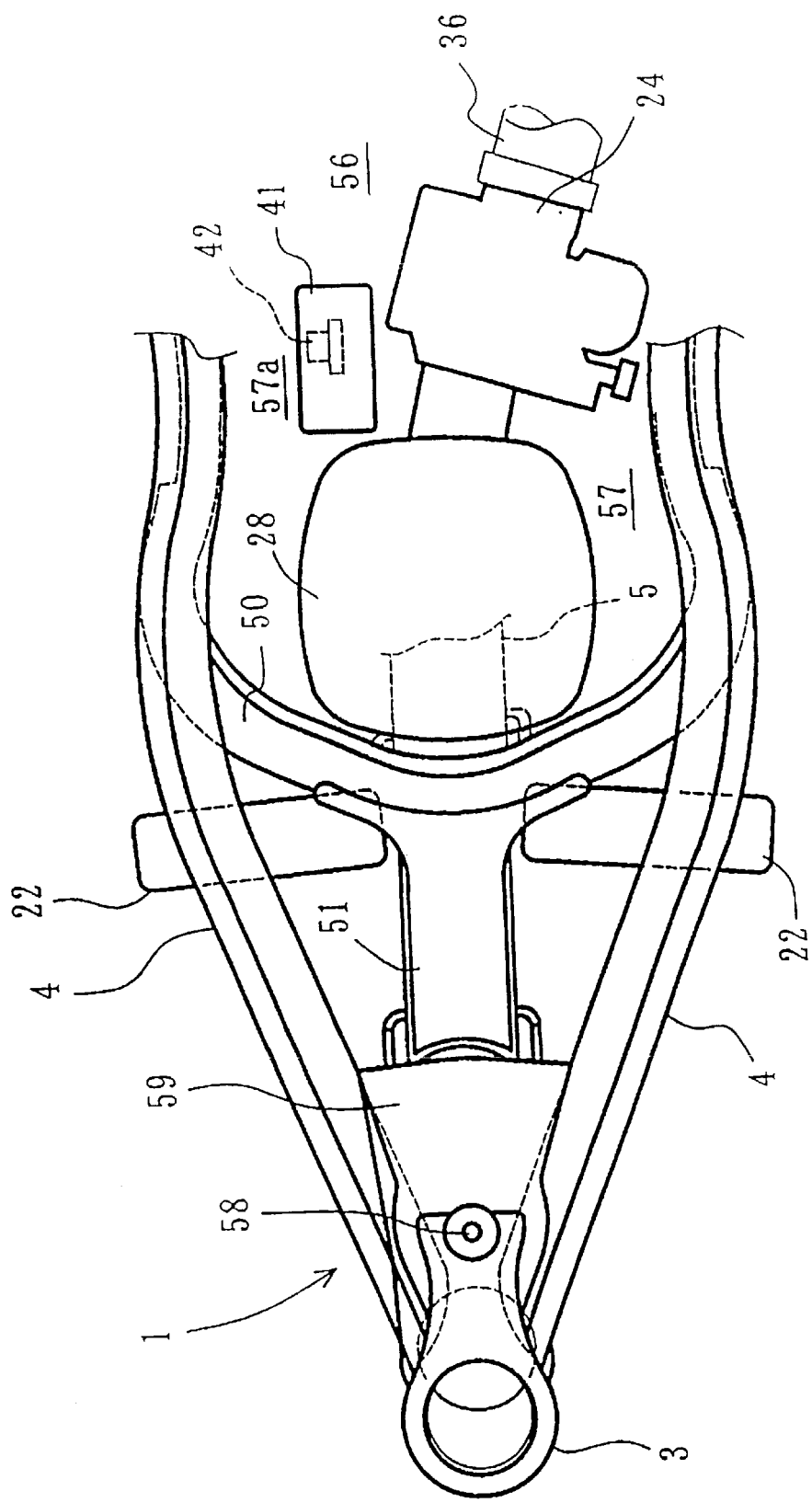
FIG. 3 is a plan view of the motorcycle, showing the layout of the components shown in FIG. 2.
Figure 4:
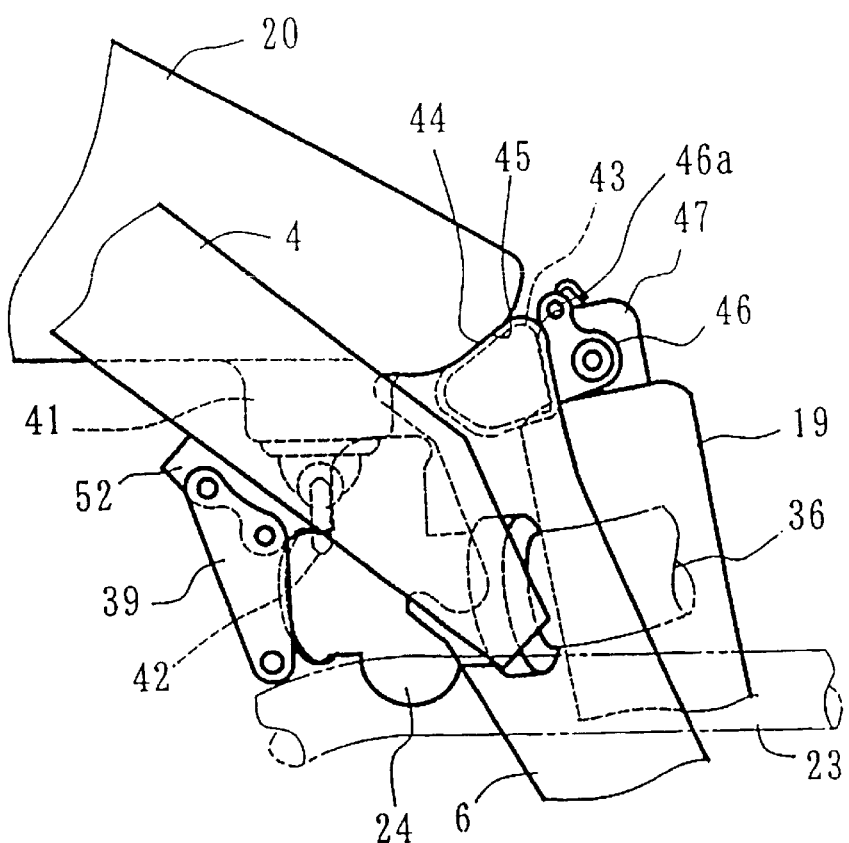
FIG. 4 is a left side view illustrating a layout of components positioned above pivot plates of a frame of the motorcycle.

Referring to FIG. 4, the fuel cock 42 is attached with the lower end thereof extending slightly downward from the lower edges of the main frames 4, when viewed from the left side of the motorcycle. Further, the projection 41 overlaps with the main frames 4, and is positioned beside the carburetor 24 in the widthwise direction of the body frame, as clearly shown in FIG. 3.

As shown in FIG. 1, the engine 2 has an upper part thereof supported by the right and left main frames 4. The front part of the engine 2 is supported by the lower part of the down tube 5. The lower part of the engine 2 is supported by the intermediate portions of the lower frames 7. Further, the crankcase 29 at the rear part of the engine 2 is supported by the right and left pivot plates 6, via the pivot shaft 15. As illustrated in FIGS. 2 and 4, the upper part of the engine 2 is supported by the underside of the right and left main frames 4 via a hanger bracket 39 using a support 38 provided at the rear part of the cylinder head 27.

FIG. 5 illustrates the layout of components near the down tube 5. FIG. 5 shows the arrangement of the radiators 22, down tube 5 and other peripheral components, viewed from the front part of the motorcycle. The upper tanks 30 of the left and right radiators 22 are connected by the return water hose 31, and communicate with a water jacket outlet near the cylinder head cover 28 via a joint tube 31a.

The water hose 33 extends from the lower tanks 32 toward the center of the motorcycle, and connects to a joint hose 34. The joint hose 34 crosses a rear part of a tapered portion 62b of the down tube 5, and reaches a water pump 49, at the right side of the crankcase, via a joint 34a which is positioned at the right side of the joint hose 34. The exhaust pipe 23 passes by the rear part of the tapered portion 62b, goes obliquely downward to the right side of the motorcycle, and extends rearward under the right radiator 22.

Figure 6:
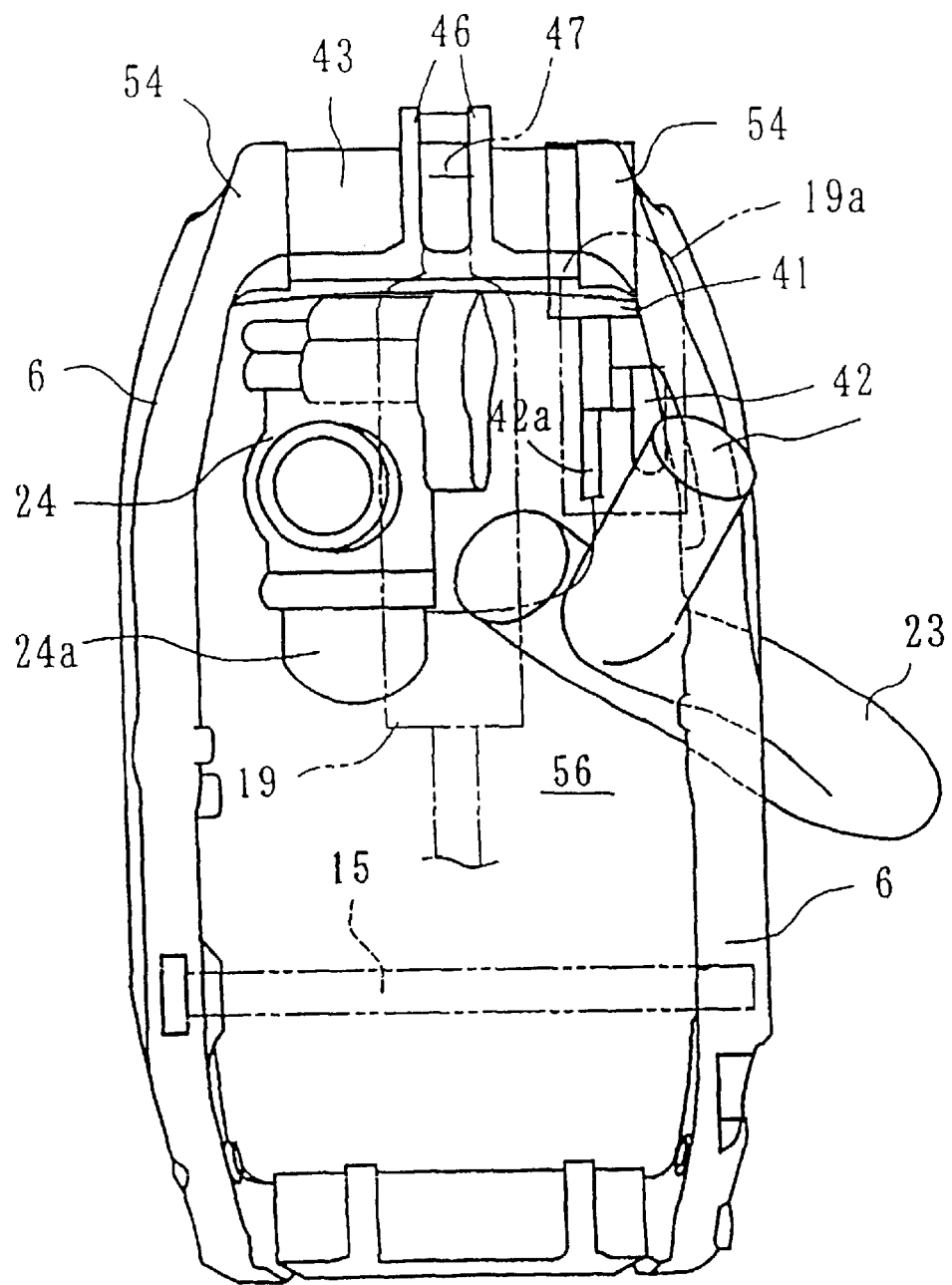
FIG. 6 illustrates a layout of components in a space under a rear cross member of the motorcycle's frame.

Various components are arranged in a space 56 defined under the rear cross member 43. FIG. 6 shows the layout of the components, viewed from the rear part of the motorcycle. In the space 56, the carburetor 24 is positioned near and under the rear cross member 43, and slightly to the left side of the motorcycle body. The projection 41 is positioned at the right side of the carburetor 24. The fuel cock 42 is positioned under the projection 41. A fuel pipe 42a extends downward from the fuel cock 42 and connects to a float chamber 24a of the carburetor 24. The fuel cock 42 is at a level slightly higher than that of the float chamber 24a.

The rear shock absorber 19 is positioned behind the foregoing components and near the center of the motorcycle. The fuel cock 42 overlaps with the front part of a reserve tank 19a, which is juxtaposed with the rear shock absorber 19. The exhaust pipe 23 extends under the fuel cock 42 and the reserve tank 19a. The front part of the exhaust pipe 23 extends obliquely rightward from the front part of the cylinder head 27, then bends toward the center of the motorcycle (see FIG. 5). The exhaust pipe 23 then passes by the inner side of the right pivot plate 6, and under the fuel cock 42 and the reserve tank 19a as described above. The exhaust pipe 23 then bends slightly to the right side of the motorcycle, and extends upwards and rearwards. The connecting tubes (not shown in FIG. 6) connecting to the carburetor 24 and the exhaust pipe 23 are positioned at the opposite sides of the rear shock absorber 19, respectively.

The structure of the motorcycle body frame 1 will be described with reference to FIGS. 7 to 10. The right and left main frames 4 are made of an aluminum alloy, or the like, which is extruded to have a rectangular cross section. The right and left main frames 4 have their front ends welded to the head pipe 3, and their rear ends welded to the upper parts of the pivot plates 6.

The down tube 5 is a square pipe made of an aluminum alloy or the like, and has its rear lower part tapered by swaging. The rear upper part of the down tube 5 and the center undersides of the left and right main frames 4 are reinforced by a tension pipe 50. The tension pipe 50 is substantially horizontal when viewed from the left side of the motorcycle, and is curved to the front part of the motorcycle.

The tension pipe 50 has its front end coupled to the down tube 5 using a gusset 51, and its rear end welded to the main frames 4. A stay 52 of the hanger bracket 39 is attached to the welded portion of the tension pipe 50 and the main frames 4. The lower part of the down tube 5 is welded to the front parts of the lower frames 7 via a joint 53. The lower frames 7 are square pipes made of an aluminum alloy or the like and branched to the left and right (see FIGS. 8 and 9).

Figure 10:
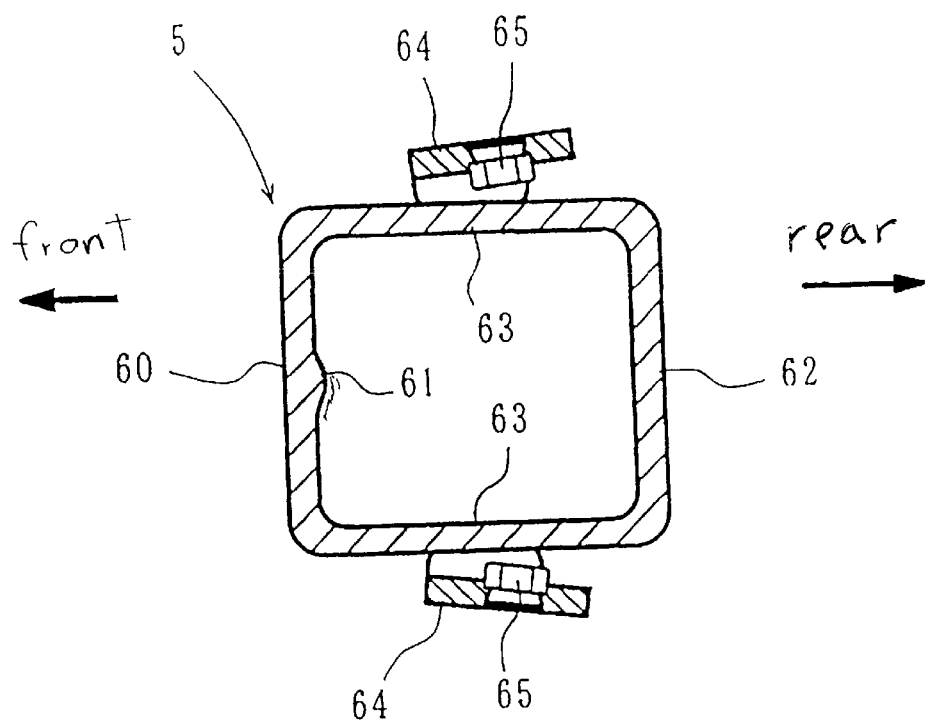
FIG. 10 is a cross sectional view, taken along line 10—10, in FIG. 7.

FIG. 10 is a cross section of the down tube 5. The down tube 5 has four sides, i.e., a front side 60, a rear side 62, and left and right sides 63. A rib 61 is formed on the inner center surface of the front side 60 as an integral part. The rib 61 extends along the length of the down tube 5. The lower half of the rear side 62 has the downwardly tapered portion 62b, while an upper surface 62a of the front half of the rear side 62 is straight. Radiator attachments 64, substantially in the shape of the letter L, are welded to the outer surfaces of the left and right sides 63. The radiator attachments 64 have weld nuts 65, in order to bolt the left and right radiators 22.

Figure 7:
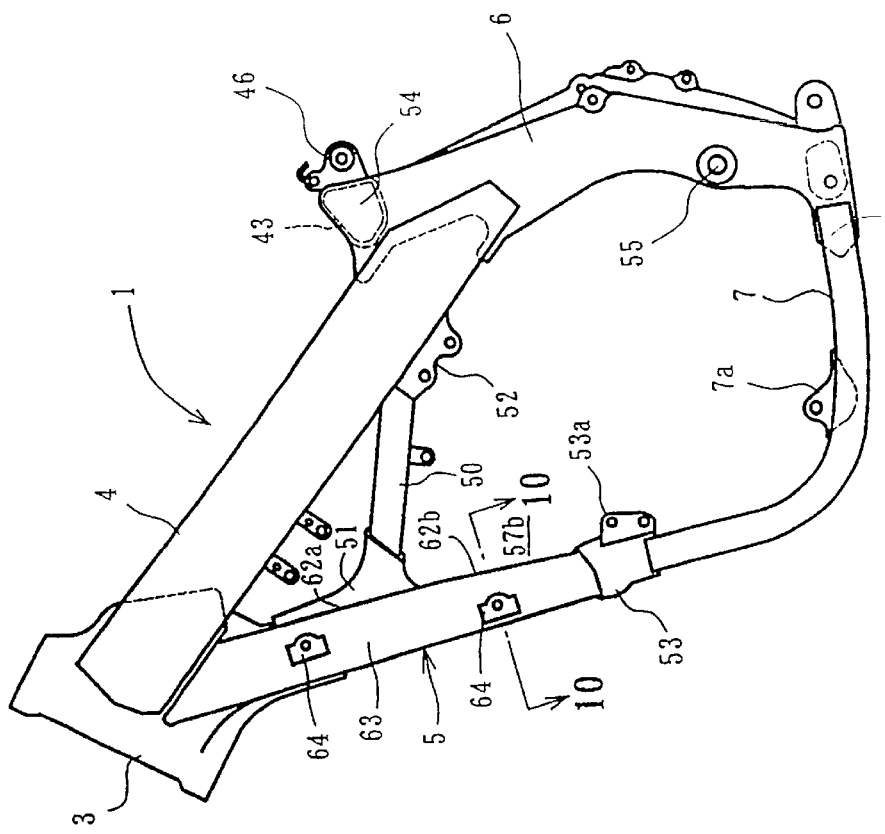
FIG. 7 is a left side view of several parts of the motorcycle's frame.

As shown in FIG. 7, only the rear side 62 of the down tube 5 has the tapered part 62b, thereby enlarging the space 57b (shown in FIG. 2) defined by the tapered part 62b, the cylinder head 27 and the front part of the cylinder head cover 28. The upper surface 62a of the rear side 62, the front side 60, and the left and right sides 63 are not tapered, but straight. In other words, the down tube 5 is not symmetrical due to the presence of the tapered part 62b, when viewed from the left side of the motorcycle.

The down tube 5 is made as follows. First of all, a rectangular, or more specifically a square pipe, having a cross section with the rib 61, as the integral part, is extruded and is orthogonally swaged in four directions. This procedure allows the down tube 5 to have a particular side tapered to a desired length. The swaging process is well-known, and is effective in optionally and partially changing a thickness of one side of the down tube 5, so that the rib 61 can be easily formed.

The pivot plates 6 are made by a process such as casting or forging an aluminum alloy. The pivot plates 6 are in the shape of a plate, and have upper ends 54 extending higher than the rear ends of the main frames 4. The upper ends 54 are curved inward (see FIGS. 8 and 9), and have recesses on their curved surfaces. The opposite ends of the rear cross member 43 are fitted into these recesses and are welded therein. Pivot receptacles 55 are formed under the centers of the pivot plates 6, thereby receiving the opposite ends of the pivot shaft 15.

The rear cross member 43 is made by a process such as casting or forging an aluminum alloy or the like. The rear cross member 43 is preferably hollow. The rear cross member 43 receives the rear end 45 of the fuel tank 20 on the upper surface 44 thereof. A center of the rear cross member 43 includes a forked shock absorber bracket 46 as an integral part. The shock absorber bracket 46 extends rearward, and movably supports an upper end 47 of the rear shock absorber 19. The rear shock absorber bracket 46 is slightly offset from the center C of the motorcycle, and is positioned in order to minimize the offset. The shock absorber bracket 46 has on its upper part an opening 46a for mounting the seat rails 8 (see FIG. 4).

Figure 8:
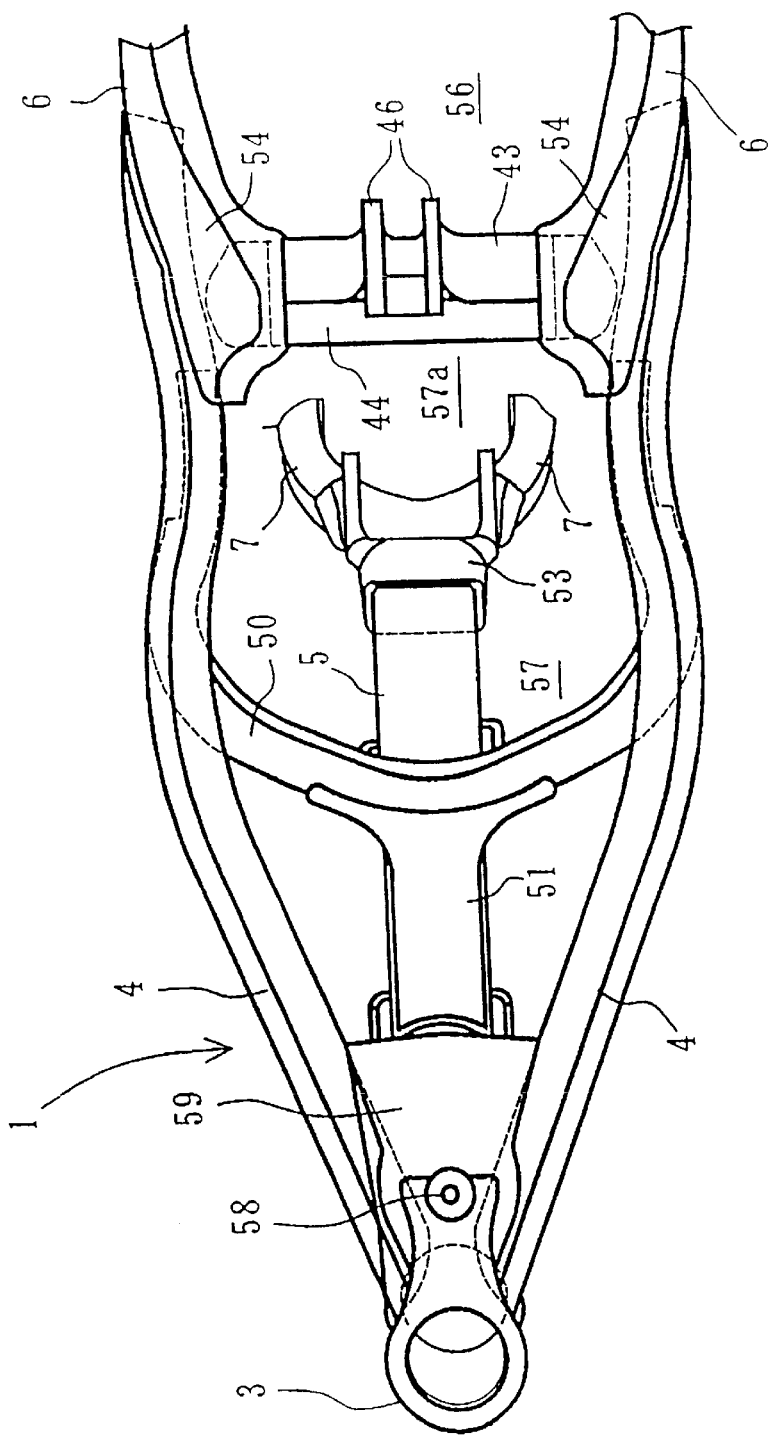
FIG. 8 is a plan view of the front part of the motorcycle's frame.

As illustrated in FIG. 6, the space 56, defined under the rear cross member 43 and between the left and right pivot plates 6 and the pivot shaft 15, is very large. The space 56 houses the rear shock absorber 19, exhaust pipe 23 and connecting tube 36. As illustrated in FIG. 8, the large space 57 in front of the rear cross member 43 extends above the tension pipe 50 and behind the head pipe 3, and houses the fuel tank 20 therein. A rear cylinder space 57a is present at the rear part of the space 57, i.e., behind the cylinder head cover 28 of the engine 2 (see FIG. 3).

Figure 9:
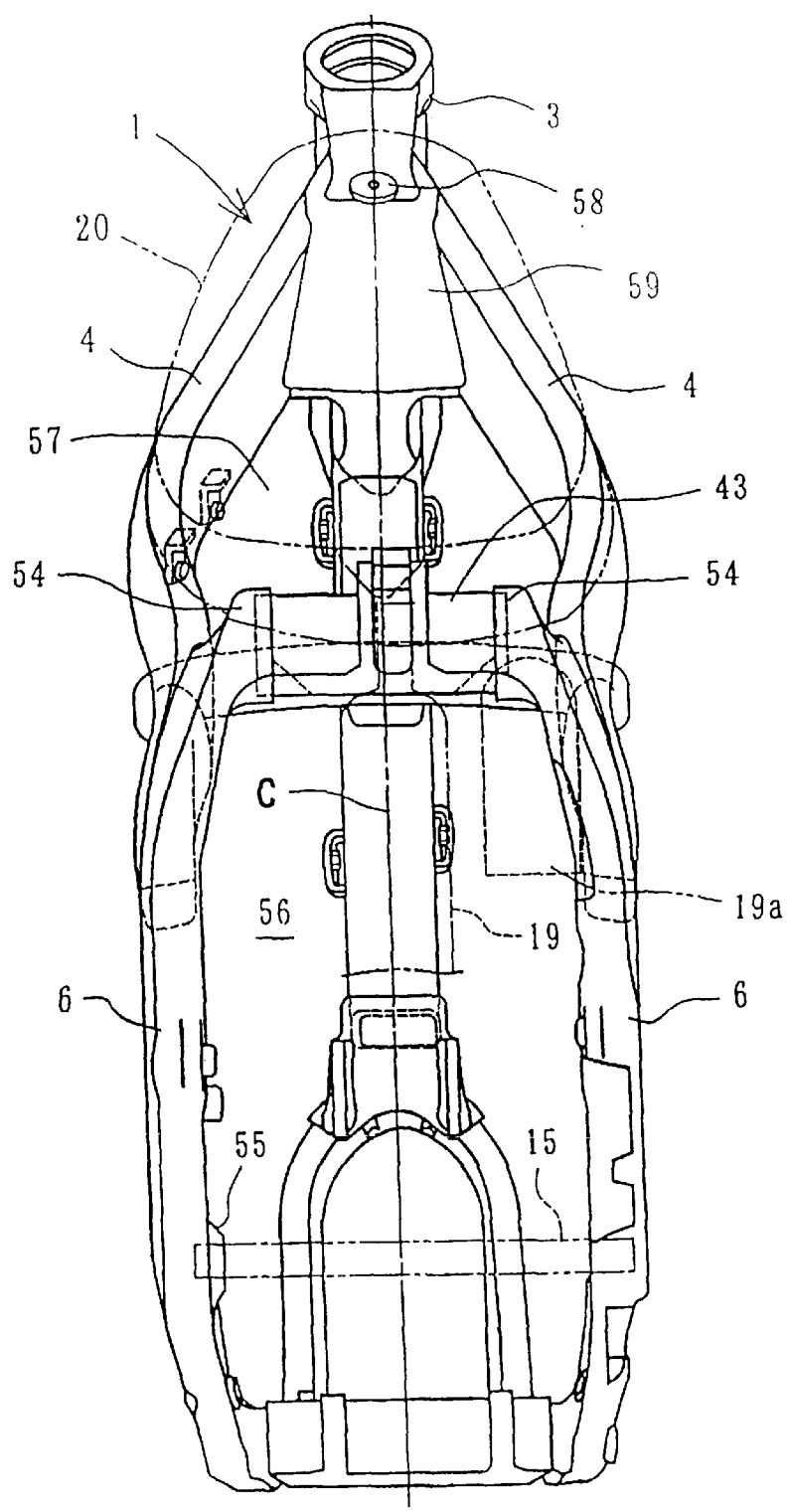
FIG. 9 is a plan view of the rear part of the motorcycle's frame.

FIGS. 8 and 9 illustrate a boss 58 for attaching the bracket 40 integrally with the head pipe 3. A cross member 59 extends from the rear part of the head pipe 3, as an integral part. The cross member 59 joins the left and right main frames 4. As illustrated in FIG. 7, a stay 53a is provided at the joint 53 in order to support the engine 2. Also, stays 7a are provided at the lower frames 7 in order to support the engine 2.

Next, an operation of the present invention will be described. As shown in FIG. 10, the rib 61 is integrally provided on an inner surface of a front surface 60 of the down tube 5. The rib 61 makes it possible to increase the rigidity of only the front surface 60, which is the most stressed section. It is possible to make the other surfaces 62 and 63 thinner than the rib 61. Accordingly, it is possible to realize an overall reduction in weight, while ensuring the required rigidity of the overall down tube 5.

As shown in FIG. 2, a lower end of the rear surface 62 of the down tube 5 is made into a tapered section 62b. Therefore, by providing the rib 61 on the front surface 60 and providing the tapered section 62b on the rear surface 62, it is possible arbitrarily balance the rigidity of the down tube 5 and the vehicle frame 1. Such balancing is advantageous to a vehicle's layout.

The space 57b, formed between the tapered section 62b and each of the side sections of the cylinder head 27 and the cylinder head cover 28, is increased due to the tapering of the tapered section 62b. Therefore, it is possible to arrange the joint hose 34 (which is a water hose for the radiator 22) and the exhaust pipe 23 within the space 57b. As a result, it becomes possible to reduce the overall length of the vehicle and to make the vehicle more compact.

In forming the down tube 5, an angular cross section pipe is subjected to the tapering process and has a thickness deviation. Such a down tube 5 can be easily formed by, extruding the angular cross section pipe, and then after extruding the angular pipe, applying a special swaging process to compress the extruded angular pipe from only four orthogonal directions. Inside the rear surface 62, an upper section 62a is a straight section. This straight section may be used as a joining surface, so that a welding processing can be performed easily when welding the tension plate 51.

The present invention is not limited to the above-described embodiments, and various adaptations are possible. For example, if the front surface 60 is tapered, the front wheel can be brought closer to the down tube 5, which means that there is increased freedom with respect to selecting the position of the headpipe 3, and there is increased freedom with respect to the vehicle geometry.

Also, by performing a swaging process on the side surface 63 of the down tube 5 to taper it, it is possible to move the attachment position of the radiator 22 towards the center of the vehicle. In this way, it is possible to reduce a width of the vehicle, and to make the vehicle light in weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motorcycle comprising:
   an engine;
   a head pipe located in a forward portion of said motorcycle;

a main frame running from said head pipe, above said engine and towards a rear portion of said motorcycle; and a down frame extending from said headpipe and sloping diagonally downward to a front of said engine, said down frame having a hollow interior and including a strengthening rib integrally provided on an inner surface of said hollow interior of said down frame, wherein a first side surface of said down frame is formed in a tapered shape becoming gradually thinner in a downward, direction, said first side surface of said down frame being considered to be a rear side, as taken in a normal travel direction of said motorcycle, and wherein said strengthening rib extends along an entire length of said inner surface of said down frame opposite to said first side surface.

2. The motorcycle according to claim 1, wherein said tapered shape is formed by performing a swaging processing on said first side surface of said down frame.

3. The motorcycle according to claim 1, further comprising:

a space formed between a tapered portion of said down frame and said engine; and a radiator hose passing through said space.

4. The motorcycle according to claim 3, further comprising:

an exhaust pipe passing through said space.

5. The motorcycle according to claim 1, wherein said down frame includes a rectangular cross section.

6. The motorcycle according to claim 1, wherein said down frame is constructed of aluminum or an aluminum alloy.

7. The motorcycle according to claim 1, further comprising:

radiator attachments provided on outer surfaces of left and right sides of said down frame.

8. A motorcycle comprising:

an engine;

a head pipe located in a forward portion of said motorcycle;

a main frame running from said head pipe, above said engine and towards a rear portion of said motorcycle; and a down frame extending from said headpipe and sloping diagonally downward to a front of said engine, said down frame having a hollow interior and including a strengthening rib integrally provided on an inner surface of said hollow interior of said down frame, wherein a lower half of a first side surface of said down frame is formed in a tapered shape becoming gradually thinner in a downward direction, and an upper half of said first side surface is not tapered, and wherein said strengthening rib extends along an entire length of said inner surface of said down frame opposite to said first side surface.

9. A motorcycle comprising:

an engine;

a head pipe located in a forward portion of said motorcycle;

a main frame running from said head pipe, above said engine and towards a rear portion of said motorcycle; and a down frame extending from said headpipe and sloping diagonally downward to a front of said engine, said down frame having a hollow interior and including a strengthening rib integrally provided on an entire length of a front inner surface of said hollow interior of said down frame, wherein a lower half of a rear side surface of said down frame is formed in a tapered shape becoming gradually thinner in a downward direction, and an upper half of said rear side surface is not tapered, wherein two side surfaces of the down frame are thinner than the strengthening rib.

* * * * *